March 29, 1955

C. H. INGWER 2,705,119

PIPE SUPPORT STAND

Filed Dec. 6, 1949

INVENTOR.
CARL H. INGWER
BY
*J. N. Douglas*
*his atty*

United States Patent Office 2,705,119
Patented Mar. 29, 1955

2,705,119

PIPE SUPPORT STAND

Carl H. Ingwer, Elyria, Ohio, assignor to The Ridge Tool Company, Elyria, Ohio

Application December 6, 1949, Serial No. 131,480

3 Claims. (Cl. 248—55)

This invention relates to pipe supporting stands and more particularly to a stand of adjustable height adapted to support one end of a pipe while the other end is being worked on.

In working with ordinary sizes of pipe in the field, a plumber ordinarily makes use of a pipe vise mounted on a small stand. For short lengths of pipe this may be all that is required. However, for greater lengths of pipe where one end of the pipe overhangs the stand by a considerable distance, it is desirable and often necessary that this overhanging end be supported.

The ordinary solution of the problem of support was a length of pipe mounted on three or four feet and having the upper end split longitudinally and separated into a Y-shaped crotch in which the pipe was supported. This was usually satisfactory but seldom adequate since there was no adjustment of the height of the device.

In order to achieve an adjustment, a telescoping stand was used having a single transverse hole in the outer column and a series of holes in the inner column. A pin was inserted into these holes to hold the inner columns at the desired height. However, pins were frequently lost or misplaced, and each time an adjustment of height was necessary, the holes had to be lined up before the pin could be inserted. Then if the crotch were not properly aligned with the vise or other support, the entire stand had to be turned. Furthermore, during use, the vibration sometimes caused the pin to work out resulting in a sudden lowering of the stand and damage to the pipe and equipment.

By my invention, I have provided an adjustable stand in which there are no pins to be misplaced and the supporting head of which can be freely turned in any direction. In addition, I provide rollers in the supporting head so that the pipe may be easily adjusted longitudinally. A safety stop is also provided to prevent the device from pinching, smashing or otherwise injuring the handler's fingers or hand.

A more complete understanding of my invention may be had by reference to the following figures and description which form a part of this specification.

Briefly, my invention comprises an adjustable stand composed of a pair of telescoping columns. The inner of the columns has a plurality of grooves formed therein, longitudinally spaced and releasably engaged by a ball locking mechanism disposed on the outer column. Provision is made for supporting the stand upright and a roller device is provided on which the pipe rests.

Figure 1:
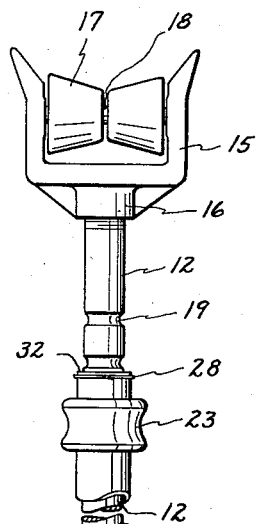
Fig. 1 is a view showing my device in its entirety.

More specifically and with reference to the drawings, my invention, as shown in Fig. 1, comprises an outer column 11 and an inner column 12 which may be pipe of such size that they will telescope freely together. The lower end of the outer column 11 is provided with screw threads 13, of pipe thread formation preferably, which may be threaded into a base 14. The base may be of any convenient type having a female thread to receive this upright.

At the top of the inner column 12, I provide a device for supporting the pipe. This device comprises a fork 15 having a socket boss 16 into which the column 12 may be threaded. A pair of rollers 17 in the shape of truncated cones is journalled on a pin 18 having their smaller diameters together near the center of the pin. The pin 18 extends through the arms of the fork and is held therein by peening over the ends or any other convenient means.

Figure 2:
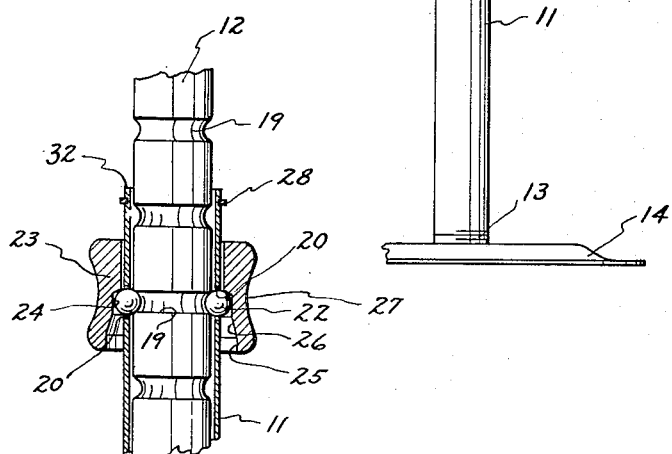
Fig. 2 is an enlarged sectional view of the adjusting mechanism of my device.

The adjustment means is best shown in Fig. 2. A series of circumferential grooves 19 is formed in the inner column 12. These grooves may be at equal longitudinal spacing or it may be desirable to form them at unequal spacing. The grooves 19 are preferably formed by rolling them into the pipe rather than cutting, since cutting might seriously weaken the columns.

The outer pipe 11 has holes, or sockets 20, drilled into it near the top thereof, having a diameter equal to or slightly larger than the width of the groove 19. Hardened steel balls 22 similar to the balls of a ball bearing are placed in these holes. A ring 23 is slidably disposed about the outer column 11 to cover these balls 22 and prevent them from dropping from the holes. This ring is of considerable length and has an inner surface formed with a cylindrical race 24 which fits over the balls 22 and is adapted to hold them in the grooves 19 when the ring is in its lower position. A larger diameter cylindrical surface 25 is formed at the lower edge of the ring which will allow the balls 22 to retract from the grooves. Joining the two cylindrical surfaces is a tapered surface 26 adapted to press the balls firmly against the inner column under the influence of the weight of the ring 23. The outer surface 27 may be in a convenient handle shape. A split ring 28 is disposed in a groove in the outer column in position to be engaged by the sliding ring 23 so that the sliding ring is not accidentally raised so high as to allow the balls 22 to drop out of their sockets.

Near the lower end of the outer column 11 a stop is formed. I prefer to do this by rolling a groove 30 in the outer column similar to those on the inner column. Rolling such a groove forms an inwardly projecting ring within the column which will be engaged by the outer column to prevent further downward motion of the column. A split ring 31 may be disposed in the lower part of the inner column to act both as a guide and a stop to engage the inner surface of the groove. It is obvious, however, that such a stop could be formed by other means such as a pin extending diametrically across the column. This stop is at a location such that the socket boss 16 of the pipe supporting device will remain above the top surface 32 of the outer column 11 when the member 12 is in its lowest position and will not crush or accidently pinch the fingers of whoever is handling the device when it is lowered to the lowermost position.

In use the stand may be placed in the desired position in line with the vise in which the pipe to be operated on is held. It may then be adjusted to approximately the proper height. This is done by raising the ring 23 upward as far as possible. This will release the balls 22 from the groove 19 in which they were engaged, and allow the inner column 12 to be raised. When the rollers 17 are at the proper height, the ring 23 may be released and the tapered surface 26 will urge the balls 22 into whichever groove first comes into register with the sockets 20. The fork may still be turned easily to any desired direction without changing the position of the base.

When it is desired to take the stand down, the ring 23 is simply raised releasing the balls 22 and the inner column 12 lowered or allowed to slide down of its own weight. Since the stop ring 31 will engage the inner surface of the groove 30 before the boss 16 reaches the top surface 32, it is obvious that there will be no pinched or crushed fingers as a result of this lowering operation.

Thus it is apparent that I have provided an adjustable support, safe and convenient to use and to carry. It is not only easy to adjust but foolproof in operation and, in addition, has a very convenient pipe rest on which the pipe may roll easily.

Having thus described my invention, I am aware that numerous changes and departures may be made therefrom without departing from the spirit or scope of my invention.

I claim:

1. A pipe rest comprising a base, a tubular member extending upwardly from the base, a second tubular member slidably disposed in the first tubular member and having pipe support means on its upper end, means to hold said tubular members in a fixed position relative to each other comprising balls disposed in apertures in the outer tubular member and selectively engageable with one of a plurality of circumferential grooves formed on the inner tubular member, said inner member being rotatable with respect to said first mentioned tubular member when said balls are disposed in said circumferential groove, and means to hold said balls in said grooves comprising a ring slidably disposed on the outer tubular member, said ring having a portion for free sliding engagement with the outer tubular member and having a cylindrical zone of a length greater than the radius of the balls, and a diameter such as to hold the balls in said grooves and apertures, and a tapered zone extending downwardly from said first zone of a diameter sufficient to allow the balls to move out of the grooves but to retain them in the apertures.

2. A pipe rest comprising a base, a tubular member extending upwardly from the base, a second member slidably disposed in the first tubular member and having pipe support means on its upper end, means to hold said members in a fixed position relative to each other comprising balls disposed in apertures formed in the outer tubular member and selectively engageable with one of a plurality of circumferential grooves formed on the inner tubular member, said inner member being rotatable with respect to said first mentioned tubular member when said balls are disposed in said circumferential groove, and means to hold said balls in said apertures and grooves comprising a ring disposed on the outer tubular member and freely slidable thereon, said ring having a portion for free sliding and guiding engagement with the outer tubular member and formed with an inner cylindrical zone of a length greater than the radius of the balls, and of a diameter such as to hold the balls in said grooves and apertures, and a second zone extending from said first zone providing a wall increasing in diameter toward the lower end of the ring, the portion of largest diameter being sufficiently large to allow the balls to move out of the grooves but to retain them in the apertures, and means carried by the outer tube engageably by said ball holding means to limit the movement thereof and hold it against travel beyond the balls.

3. A pipe rest comprising a base, a tubular member extending upwardly from the base, a second member slidably disposed in the first tubular member and having pipe support means on its upper end, means to hold said members in a fixed position relative to each other comprising balls disposed in apertures formed in the outer tubular member and selectively engageable with one of a plurality of circumferential grooves formed on the inner tubular member, said inner member being rotatable with respect to said first mentioned tubular member when said balls are disposed in said circumferential groove, and means to hold said balls in said apertures and grooves comprising a weight in the form of a ring disposed on the outer tubular member and freely slidable thereon, said ring having a portion for free sliding and guiding engagement with the outer tubular member and formed with an inner cylindrical zone of a length greater than the radius of the balls, and of a diameter such as to hold the balls in said grooves and apertures, and a second zone extending from said first zone providing a wall increasing in diameter toward the lower end of the ring, the portion of largest diameter being sufficiently large to allow the balls to move out of the grooves but to retain them in the apertures, and means carried by the outer tube engageably by said ball holding means to limit the movement thereof and hold it against travel beyond the balls, and means at the end of the inner member to limit the travel of the inner member in the outer member.

References Cited in the file of this patent

UNITED STATES PATENTS

| Number | Name | Date |
|---|---|---|
| 764,491 | Newlove | July 5, 1904 |
| 1,031,637 | Fischer | July 2, 1912 |
| 1,240,521 | Wendland | Sept. 18, 1917 |
| 1,270,977 | Schade | July 2, 1918 |
| 1,338,437 | Greene | Apr. 27, 1920 |
| 1,636,421 | Knott | July 19, 1927 |
| 1,855,508 | Berck | Apr. 26, 1932 |
| 1,890,423 | Teagarden | Dec. 6, 1932 |
| 2,135,861 | Thompson | Nov. 8, 1938 |
| 2,388,056 | Hendricks | Oct. 30, 1945 |
| 2,472,654 | Engelke | June 7, 1949 |
| 2,481,945 | Panyard | Sept. 13, 1949 |